US012591468B2

(12) United States Patent
Ruiz et al.

(10) Patent No.: US 12,591,468 B2
(45) Date of Patent: Mar. 31, 2026

(54) DYNAMIC MANAGEMENT OF FEATURES FOR PROCESSES EXECUTABLE ON AN INFORMATION HANDLING SYSTEM

(71) Applicant: DELL PRODUCTS L.P., Round Rock, TX (US)

(72) Inventors: Ricardo Antonio Ruiz, The Colony, TX (US); Daniel Thomas Daugherty, Plano, TX (US)

(73) Assignee: Dell Products L.P., Round Rock, TX (US)

( * ) Notice: Subject to any disclaimer, the term of this patent is extended or adjusted under 35 U.S.C. 154(b) by 447 days.

(21) Appl. No.: 18/377,214

(22) Filed: Oct. 5, 2023

(65) Prior Publication Data

US 2025/0117267 A1     Apr. 10, 2025

(51) Int. Cl.
*G06F 9/52*     (2006.01)
*G06F 9/48*     (2006.01)
*G06F 9/54*     (2006.01)

(52) U.S. Cl.
CPC .............. *G06F 9/52* (2013.01); *G06F 9/4887* (2013.01); *G06F 9/542* (2013.01)

(58) Field of Classification Search
None
See application file for complete search history.

(56) References Cited

U.S. PATENT DOCUMENTS

| 7,200,701 | B2 * | 4/2007 | Stultz | ...................... | G06F 13/24 |
| | | | | | 710/267 |
| 7,721,024 | B2 * | 5/2010 | Stultz | ...................... | G06F 13/24 |
| | | | | | 710/33 |
| 9,104,504 | B2 * | 8/2015 | Chow | ........................ | G06F 8/54 |
| 9,128,895 | B2 * | 9/2015 | Chan | .................... | G06F 15/173 |
| 9,774,503 | B2 * | 9/2017 | Nair | ........................ | H04L 41/12 |

(Continued)

OTHER PUBLICATIONS

Singh et al., "Systems And Methods For Adjusting Frame Rate Of Graphics Intensive Applications Based On Priority To Improve Information Handling System Performance", U.S. Appl. No. 18/130,860, filed Apr. 4, 2023, 32 pgs.

(Continued)

*Primary Examiner* — Van H Nguyen
(74) *Attorney, Agent, or Firm* — Egan, Enders & Huston LLP.

(57)     ABSTRACT

Systems and methods are provided that may be implemented to manage execution of multiple processes that are executable on a programmable integrated circuit of an information handling system in a way that minimizes the impact of executing these multiple processes on the operating system and on the hardware resources of the information handling system. In one embodiment, the disclosed systems and methods may be implemented to dynamically discover features implemented by or otherwise hosted by individual OS processes (or feature host processes) at runtime and to allow a group of multiple feature host processes to share their features via interprocess communication to deliver a cohesive software experience, while at the same time minimizing the impact of these group of feature host processes on the operating system and the hardware resources of an information handling system on which they are executable.

20 Claims, 9 Drawing Sheets

(56) References Cited

U.S. PATENT DOCUMENTS

| 2005/0102457 | A1* | 5/2005 | Stultz | G06F 13/24 |
| | | | | 710/260 |
| 2010/0211681 | A1* | 8/2010 | Chan | G06F 9/5011 |
| | | | | 709/226 |
| 2016/0127191 | A1* | 5/2016 | Nair | H04L 41/12 |
| | | | | 709/224 |
| 2022/0027179 | A1* | 1/2022 | Caldarale | G06F 9/45545 |
| 2022/0334836 | A1 | 10/2022 | Ruiz et al. | |

OTHER PUBLICATIONS

Daugherty et al., "Distributed And Persisted User Notifications" U.S. Appl. No. 18/223,437, filed Jul. 18, 2023, 70 pgs.

* cited by examiner

200

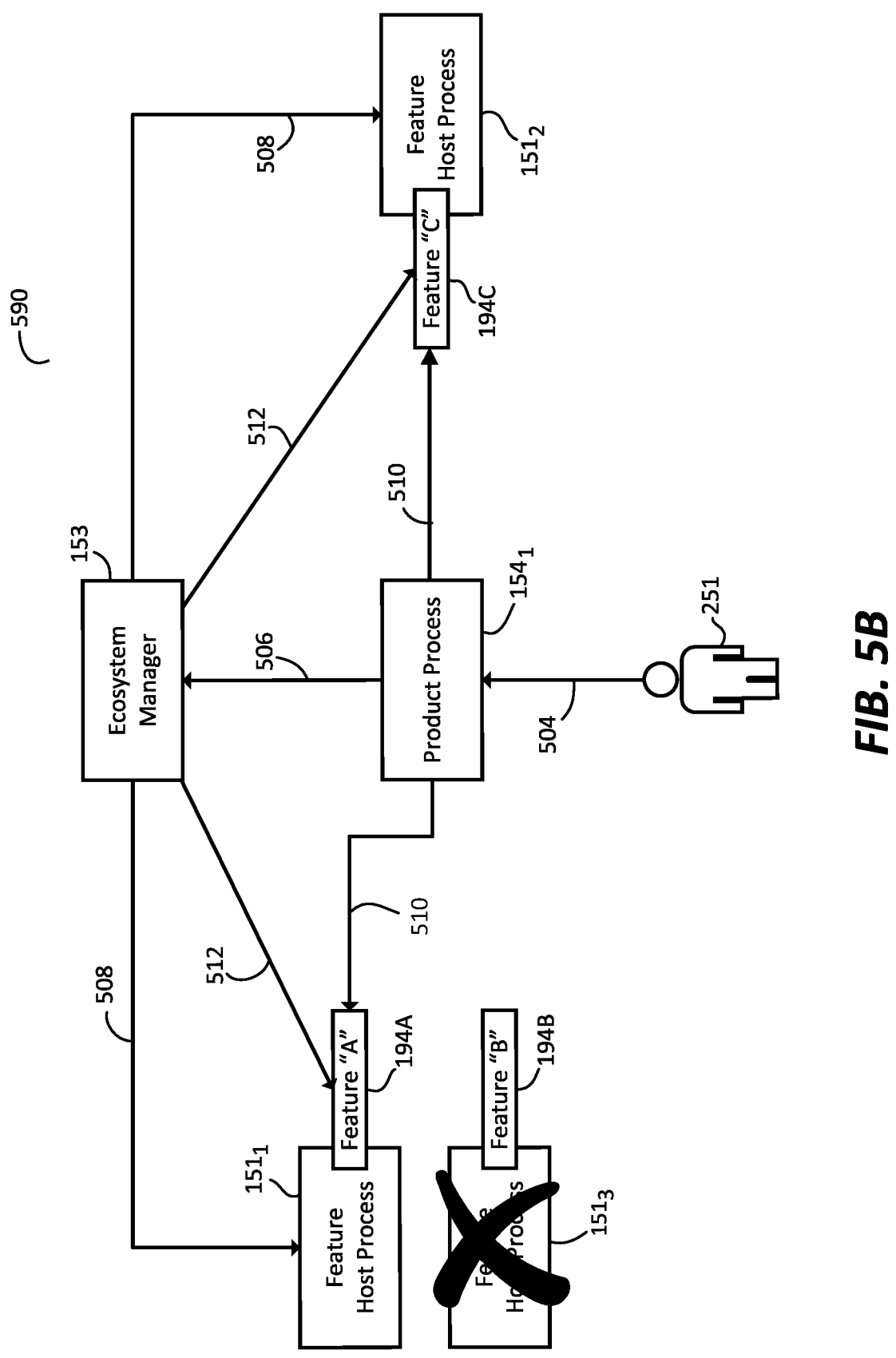
*FIB. 5B*

DYNAMIC MANAGEMENT OF FEATURES FOR PROCESSES EXECUTABLE ON AN INFORMATION HANDLING SYSTEM

FIELD

This application relates to information handling systems and, more particularly, to processes executable on an information handling systems.

BACKGROUND

As the value and use of information continues to increase, individuals and businesses seek additional ways to process and store information. One option available to human users is information handling systems. An information handling system generally processes, compiles, stores, and/or communicates information or data for business, personal, or other purposes thereby allowing human users to take advantage of the value of the information. Because technology and information handling needs and requirements vary between different human users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific human user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

Traditionally, complex client applications, such as virus suites, span (or make use of) multiple operating system (OS) processes. Most of the time, this is done to isolate shared features of each given one of these multiple OS process which can be used by other client applications via interprocess communication. This use of multiple OS processes comes at the cost of system resources such as central processing unit (CPU), memory, battery, etc. Normally, client applications are programmed to try to control their use of OS process resources and start some of these OS processes on demand. However, even then, these OS processes continue executing once started, and there is a price to pay for the mere existence of these multiple OS processes.

SUMMARY

Disclosed herein are systems and methods that may be implemented to manage execution of multiple processes (such as operating system (OS) processes) that are executable on a programmable integrated circuit of an information handling system (e.g., laptop or notebook computer, smart phone, tablet computer, convertible computer, desktop or all-in-one computer, computer server, etc.) in a way that minimizes the impact of executing these multiple processes on the operating system and on the hardware resources of the information handling system. In one embodiment, the disclosed systems and methods may be implemented to dynamically discover the identity (e.g., feature characteristics such as name, identifier (ID), capabilities, functionalities, etc.) of individual features (e.g., including capabilities) implemented by or otherwise hosted by individual OS processes (referred to herein as feature host processes or host processes) at runtime (e.g., OS runtime). In this way, a group of multiple feature host processes may share their features via interprocess communication to deliver a cohesive software experience, while at the same time minimizing the impact of these group of feature host processes on the operating system and the hardware resources of an information handling system on which they are executable.

In one exemplary embodiment, the disclosed systems and methods may be implemented to only determine the identity of features of the individual feature host processes dynamically at runtime and not in any other way, e.g., without requiring creators (e.g., software or firmware programmers) of these feature host processes to predefine where (i.e., in which individual feature host processes) these features are found.

In one embodiment, the disclosed systems and methods may be implemented to manage execution of multiple feature host processes by executing (launching or continuing to execute) only those feature host processes on a programmable integrated circuit of an information handling system that host features that are currently needed by one or more other processes (e.g., including product processes that expose a software product to a user of the information handling system) that are executing on the programmable integrated circuit of the information handling system, and by shutting down (or terminating execution of) feature host processes currently executing on the programmable integrated circuit of the information handling system that host features which are no longer needed by any of the other processes (e.g., including product processes that expose a software product to a user of the information handling system) that are executing on the programmable integrated circuit of the information handling system. Examples of such product processes include, but are not limited to, product processes implemented by large software solutions (or suites) which involve a large suite of processes working together, e.g., such as anti-virus software suites, integrated development environment software applications (IDEs), etc.

In one embodiment, the disclosed systems and methods may be implemented to take advantage of a common architecture for large software solutions to minimize the impact of these large software solutions to information handling system resources, e.g., such as resources of a central processing unit (CPU) and/or other programmable integrated circuit, memory resources, battery resources, etc. This is achieved by activating or executing individual feature host processes only when necessary, as opposed to always executing these individual feature host processes regardless of whether their features are currently needed. In a software ecosystem where a large number of product processes and feature host processes exist, the disclosed systems and methods may be so implemented to save significant information handling system resources (e.g., including extending battery life) by reacting to a user's actions and only activating individual feature host processes when they are needed.

In a further embodiment, runtime discovery of the software ecosystem components and their interconnection on an information handling system may be implemented to allow for more flexibility on how features are delivered to the information handling system. In this regard, the identity of which feature host process hosts a given feature may be determined at runtime such that execution of multiple processes on a host information handling system may be successfully managed regardless of changes over time in the identity of which feature host process hosts a given feature since the identity of the feature host process that currently hosts each feature is tracked in real time. An example of such a hosting change that may be tracked in real time for a given feature "A" would be the case where the given feature "A" is originally hosted by a first feature host process "A", but is then later hosted by a second and different feature host process "B".

In one exemplary embodiment, one or more of such feature host processes may have been started on the information handling system to allow one or more other process/es to access one or more the given features of these feature host processes, but may then be shut down later when none of their features are needed by any other processes executing on the programmable integrated circuit of the information handling system. In a further embodiment, the disclosed systems and methods may be implemented to manage execution of multiple feature host processes by dynamically adjusting to any changes in these feature host processes, e.g., by launching (or starting) inactive feature host processes and/or stopping active feature host processes.

In one exemplary embodiment, the disclosed systems and methods may be implemented to control feature host processes (e.g., such as sub-agents) that are no longer needed by any other processes so that these feature host processes only run when necessary on a programmable integrated circuit of an information handling system. Since these feature host processes are controlled in this embodiment to only run when necessary, the disclosed systems and methods advantageously allow implementation of more granular feature host processes than would conventionally be possible, i.e., to allow implementation of a more granular segmentation of application features into a feature host process such that only the required features and feature host processes execute at any particular time as opposed to a conventional implementation in which all features and their feature host processes run at all times.

In one respect, disclosed herein is a method, including using at least one programmable integrated circuit of an information handling system to: manage execution of multiple host processes, each of the host processes hosting one or more respective features on the information handling system; and execute one or more other processes on the information handling system The method may further include using the at least one programmable integrated circuit of the information handling system to manage the execution of the multiple host processes by: dynamically at runtime discovering the identity of the respective features hosted by each of the host processes, executing only those of the host processes that host at least one feature that is currently needed or currently used by at least one of the other processes to share the at least one feature with the at least one of the other processes that currently needs or uses the at least one feature, and terminating execution of any of the host processes that is currently executing on the programmable integrated circuit and that hosts no features which are currently needed or used by any of the other processes.

In another respect, disclosed herein is an information handling system, including at least one programmable integrated circuit that is programmed to: manage execution of multiple host processes, each of the host processes hosting one or more respective features on the information handling system; and execute one or more other processes on the information handling system. The at least one programmable integrated circuit may also be programmed to manage the execution of the multiple host processes by: dynamically at runtime discovering the identity of the respective features hosted by each of the host processes, executing only those of the host processes that host at least one feature that is currently needed or currently used by at least one of the other processes to share the at least one feature with the at least one of the other processes that currently needs or uses the at least one feature, and terminating execution of any of the host processes that is currently executing on the programmable integrated circuit and that hosts no features which are currently needed or used by any of the other processes.

BRIEF DESCRIPTION OF THE DRAWINGS

FIG. 5B illustrates a process ecosystem configuration according to one exemplary embodiment of the disclosed systems and methods.

DESCRIPTION OF ILLUSTRATIVE EMBODIMENTS

Figure 1:
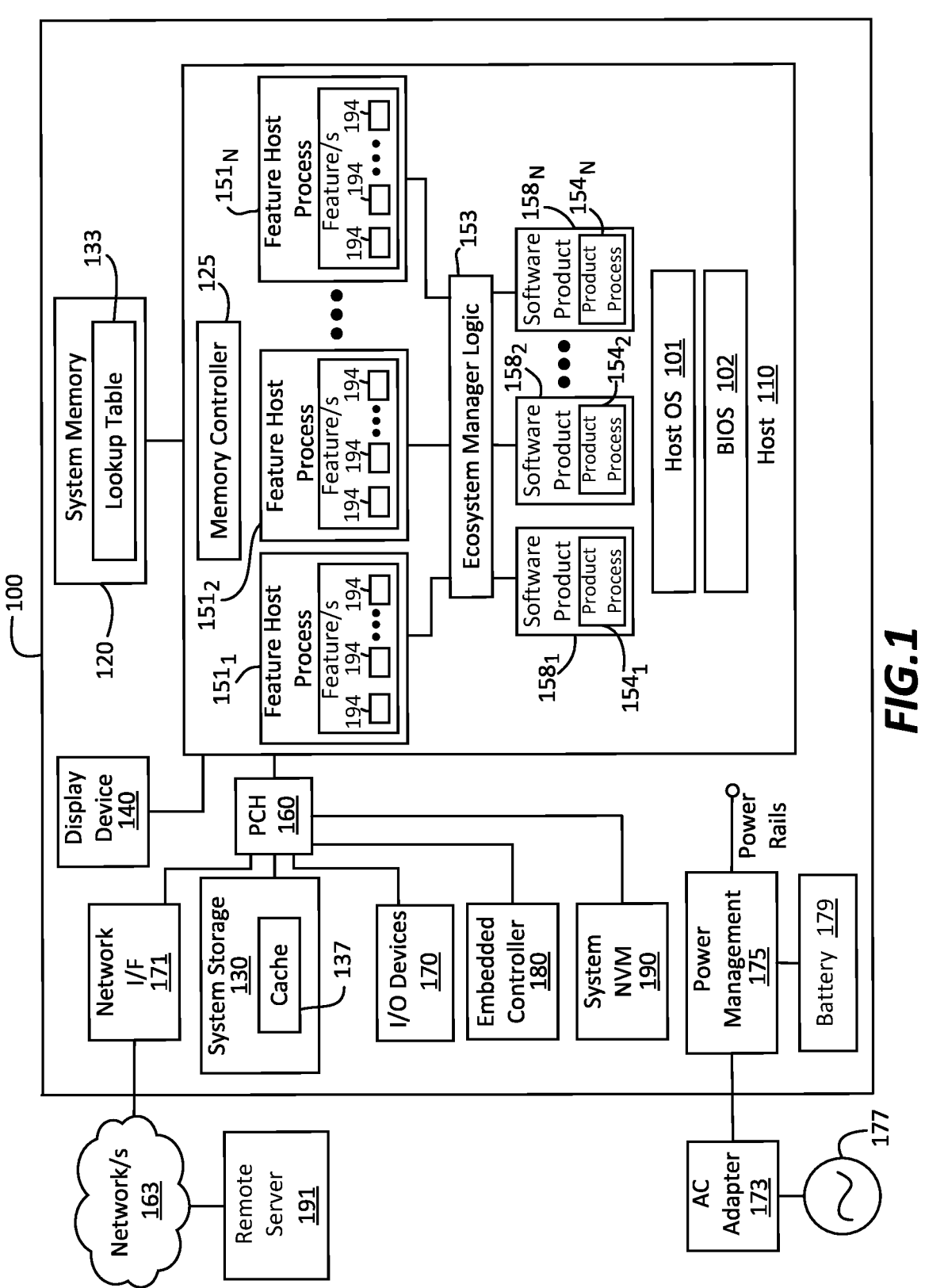
FIG. 1 illustrates a block diagram of an information handling system according to one exemplary embodiment of the disclosed systems and methods.

FIG. 1 is a block diagram of an information handling system 100 (e.g., a desktop or all-in-one computer, computer server, laptop or notebook computer, tablet or convertible computer, smart phone, etc.) according to one embodiment of the disclosed systems and methods. In this regard, it should be understood that the configuration of FIG. 1 is exemplary only, and that the disclosed methods may be implemented on other types and/or configurations of information handling systems. It should be further understood that while certain devices and components of an information handling system are shown in FIG. 1 for illustrating embodiments of the disclosed systems and methods, an information handling system is not restricted to including only (or all of) those devices and components shown in FIG. 1 and described below.

As shown in FIG. 1, information handling system 100 may include a host programmable integrated circuit 110 that executes a host operating system (OS) 101 (e.g., such as Microsoft Windows 10, Linux, etc.), BIOS 102 (e.g., unified extensible firmware interface BIOS) for system 100. Host programmable integrated circuit 110 may include any type of processing device, such as an Intel central processing unit (CPU), an Advanced Micro Devices (AMD) CPU or another programmable integrated circuit. An integrated memory controller 125 also executes within host programmable integrated circuit 110 to manage reads and writes to volatile system memory 120 (e.g., dynamic random access memory "DRAM", synchronous dynamic random-access memory "SDRAM", etc.) that is coupled as shown to host programmable integrated circuit 110.

As further shown in FIG. 1, host programmable integrated circuit 110 may be coupled to an external or internal (integrated) display device 140 (e.g., LCD or LED display or other suitable display device) depending on the particular configuration of information handling system 100. In the illustrated embodiment, integrated graphics capability may be implemented by integrated graphics features of a host programmable integrated circuit 110 to provide visual images (e.g., a graphical user interface, static images and/or video content) to a system user. However, in other embodiments, a separate programmable integrated circuit (e.g., such as graphics processor unit "GPU") may additionally or alternatively be coupled between host programmable integrated circuit 110 and display device 140 to provide graphics capability for information handling system 100.

In the embodiment of FIG. 1, a platform controller hub (PCH) 160 is coupled to control certain data paths and manage information flow between devices and components of the information handling system 100. As such, PCH 160 may include one or more integrated controllers/microcontrollers and/or interfaces for controlling the data paths connecting PCH 160 with host programmable integrated circuit 110, system storage 130 (e.g., one or more media drives, such as hard disk drives, optical drives, NVRAM, Flash memory, solid state drives "SSDs", and/or any other suitable form of internal or external nonvolatile storage), external and/or integrated input/output (I/O) devices 170 (e.g., such as one or more of touchpad, keyboard, mouse, touchscreen and associated controllers thereof) forming at least a part of a user interface for the information handling system. In the embodiment of FIG. 1, I/O devices 170 may be coupled to PCH 160 of system 100 to enable a system user to input data and interact with information handling system 100, and to interact with application programs or other software/firmware executing thereon.

Also shown in FIG. 1 are other components of system 100 coupled to host programmable integrated circuit 110 by PCH 160. These components include network interface (I/F) device 171 which in turn may be optionally coupled to one or more networks 163 (e.g., such as a wired or wireless local area network, a corporate intranet, the Internet, etc.), system NVM 190 (e.g., serial peripheral interface (SPI) Flash memory) which stores firmware images and other code for operation of system 100, and embedded controller (EC) 180 that may be configured with a microcontroller or other programmable integrated circuit to perform functions such as power/thermal system management and to execute program instructions to boot information handling system 100, etc. As shown, information handling system may be coupled to one or more other information handling systems (e.g., such as an external remote server 191) via network/s 163.

In one embodiment, PCH 160 may include a Serial Peripheral Interface (SPI) controller and an Enhanced Serial Peripheral Interface (eSPI) controller. In some embodiments, PCH 160 may include one or more additional integrated controllers or interfaces such as, but not limited to, a Peripheral Controller Interconnect (PCI) controller, a PCI-Express (PCIe) controller, a low pin count (LPC) controller, a Small Computer Serial Interface (SCSI), an Industry Standard Architecture (ISA) interface, an Inter-Integrated Circuit ($I^2C$) interface, a Universal Serial Bus (USB) interface and a Thunderbolt™ interface.

In the illustrated embodiment of FIG. 1, a power source for information handling system 100 may be provided by an external power source (e.g., mains power 177 and an AC adapter 173) and/or by an optional internal power source, such as a battery 179. As shown in FIG. 1, power management system (e.g., circuitry) 175 may be included within information handling system 100 for moderating and switching the available power from the power source/s. In one embodiment, power management system 175 may be coupled to provide operating voltages on one or more power rails to one or more power-consuming components of information handling system 100, as well as to perform other power-related administrative tasks of the information handling system 100.

Still referring to the embodiment of FIG. 1, host programmable integrated circuit also executes one or more different software products $158_1$ to $158_N$ that each communicate with ecosystem manager software (or other logic such as firmware) 153. Examples of such software products 158 include, but are not limited to, relatively large software solutions (or suites) which involve a relatively large suite of software processes executing and working together on host programmable integrated circuit 110, e.g., such as anti-virus software suites, integrated development environment software applications (IDEs), etc. However, a given software product 158 may be of any size, e.g., such as relatively smaller software product solutions that involve as few as a single software process executing on host programmable integrated circuit 110.

As described further herein, ecosystem manager logic 153 may be implemented as a software or firmware process that is responsible for managing the lifecycle of feature host software processes (e.g., OS processes) 151 which each implement or host one or more shared features 194 (e.g., shared features implemented by software code) for other processes executing in the process ecosystem of information handling system 100. In one embodiment, a feature host process 151 may be an application or other software logic which may host any number of features 194 or software product logic 154. In one embodiment, a process ecosystem (e.g., such as described and illustrated further herein) may be implemented using the disclosed systems and methods to provide interconnectivity between feature host processes 151, ecosystem manager logic 153 and software products 158. One particular example of a feature host process 151 is Dell Tech Hub available from Dell Technologies Inc. of Round Rock, Texas.

In one embodiment, ecosystem manager logic 153 may dynamically decide when to launch or stop each of feature host processes 151 in order to minimize their impact of executing these feature host processes 151 on the operating system 101 and on the hardware resources of the information handling system 100. In one embodiment, ecosystem manager logic 153 is also responsible for the dynamic discovery, at runtime, of different individual features 194 and their respective feature host processes 151, and for maintaining a map or listing (e.g., lookup table 133 in system memory 120 and/or cache 137 in system storage 130) of the full process ecosystem as described further herein.

Examples of such software products 158 include, but are not limited to, relatively large software solutions (or software suites) which involve a relatively large group of software processes executing and working together on host programmable integrated circuit 110, e.g., such as anti-virus software suites, integrated development environment software applications (IDEs), etc. However, a given software product 158 may be of any size, e.g., such as relatively smaller software solutions that involve as few as a single process executing on host programmable integrated circuit 110.

In the embodiment of FIG. 1, each of software products 158₁ to 158_N implements at least one respective product process 154₁ to 154_N in communication with ecosystem manager software 153, and which each exposes its respective software product 158₁ to 158_N to a human user of information handling system 100 for purposes of input and output of data, e.g., via display device 140 and I/O devices 170. In this embodiment, each of product processes 154 is a user-facing software process which interacts with a human system user and employs the respective shared features 194 provided or hosted by respective feature host processes 151 to deliver various functionalities of software products 158 to the system user (e.g., such as displayed information in the form of text, data, etc. on display device 140, system operations such as virus scanning of data contained on system storage 130 and in system memory 120, etc.). Examples of types of product processes 154 include, but are not limited to, customer facing applications such as a user interface that allows users to configure antivirus software, a software integrated development environment (IDE) that the user uses to write software applications, etc. Particular examples of product processes 154 include, but are not limited to, Dell SupportAssist, Dell Optimizer, My Dell, and Alienware Command Center available from Dell Technologies Inc., of Round Rock, Texas. Although multiple different software products 158₁ to 158_N may be simultaneously active (i.e., executing and running) on host programmable integrated circuit 110, it will be understood that only a single software product 158 (or none of software products 158₁ to 158_N) may be active on host programmable integrated circuit 110 at any given time, e.g., as described further herein.

In some embodiments, it is possible that a given feature 194 hosted by a given feature host process 151 may be a variant of another feature 194 that is hosted by the same given feature host process 151 or by another different feature host process 151. For example, a first feature 194 and a second feature 194 may be variants that provide information on different respective instances of related hardware, e.g., such as video setting parameters like frames per second, etc. for two different respective video chipsets such as integrated graphics and a discrete video card or graphics processing unit (GPU). In such an example, an integrated graphics video setting feature 194 may be hosted by an integrated graphics feature host process 151 and a discrete graphics video setting feature 194 may be hosted by discrete graphics feature host process 151.

As shown in FIG. 1, host programmable integrated circuit 110 executes multiple feature host processes (e.g., OS processes) 151₁ to 151_N that communicate with ecosystem manager software 153. As shown, each of multiple feature host processes 151₁ to 151_N implement one or more features 194, e.g., such as a software update service, a telemetry service, an operating system recovery service, a hard drive encryption service, a user notification orchestration service, as well as software features that implement analysis, remediation, device identification, secure storage database to store user data, background enable/disable of encryption, registration of the information handling system 100 with a remote system (e.g., an external server 191) within the cloud, etc.

Although multiple different feature host processes 151₁ to 151_N may be simultaneously active (i.e., executing and running) on host programmable integrated circuit 110, it will be understood that only a single feature host process 151 (or none of feature host processes 151₁ to 151_N) may be active on host programmable integrated circuit 110 at any given time, e.g., as described further herein.

In the embodiment of FIG. 1, ecosystem manager software 153 may be implemented as a process responsible for managing the lifecycle of the feature host processes (e.g., OS processes) 151₁ to 151_N which each implements one or more different features 194, e.g., in a manner as described further herein. For example, ecosystem manager software 153 may execute to decide when to launch or stop each of individual feature host processes 151₁ to 151_N in order to minimize their impact on computing resources of the host OS 101 and/or their impact on the hardware resources (e.g., consumption of system memory 120, I/O devices 170, system storage 130, system NVM 190, power management 175 and/or battery 179, embedded controller 180, display device 140, etc.) of information handling system 100. Further information on the types and operation of resources on an information handling system may be found, for example, in U.S. patent application Ser. No. 18/130,860 filed on Apr. 4, 2023, which is incorporated herein by reference in its entirety for all purposes.

In the embodiment of FIG. 1, ecosystem manager software 153 may also be implemented to discover at runtime the identity of each of the features 194 of each of feature processes 151₁ to 151_N, and to maintain a map or other listing of the full or entire process ecosystem including software components and their interconnection, e.g., including the identity and current status (i.e., currently executing or currently not executing) of each of the product process 154₁ to 154_N and each of the feature host processes 151₁ to 151_N (and their respective features 194) that are currently executable by host programmable integrated circuit 110 of information handling system 100.

Figure 2A:
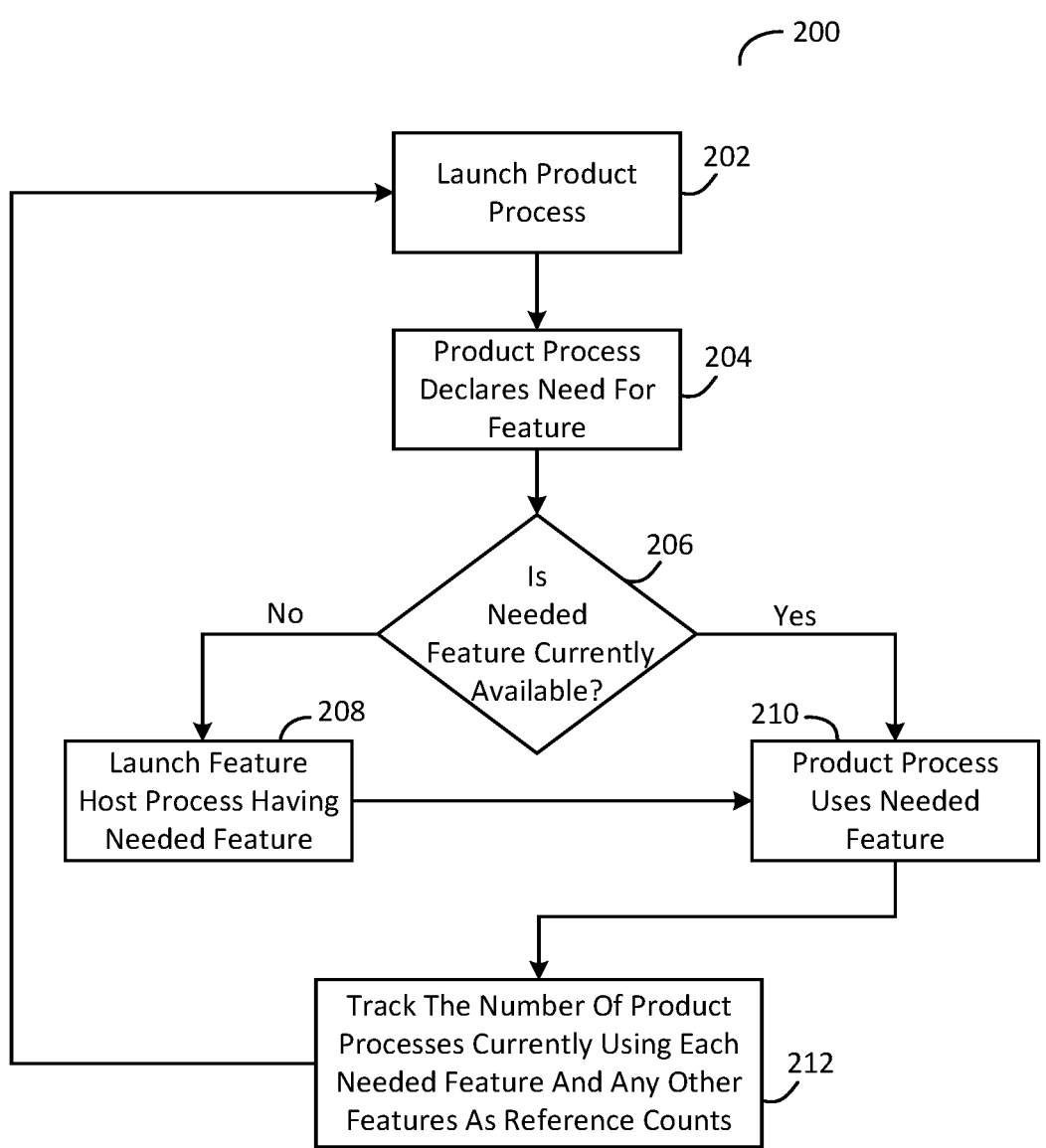
FIG. 2A illustrates methodology according to one exemplary embodiment of the disclosed systems and methods.

FIG. 2A illustrates one exemplary embodiment of a methodology 200 that may be implemented to dynamically make feature/s 194 available on one or more feature host processes 151 (which is each a separate executable process) to a product process 154 during runtime of host programmable integrated circuit 110 of information handling system 100. For purposes of illustration, methodology 200 of FIG. 2A is described in relation to an exemplary process ecosystem configuration 290 illustrated in FIG. 2B, it being understood that methodology 200 may be implemented with other configurations of process ecosystems, e.g., having greater or lesser numbers of feature host processes 151 and/or their respective features 194. In this regard, a given process ecosystem configuration may include many more feature host processes 151 and many more features 194 hosted by each of these respective feature host processes 151 than is illustrated and described in relation to FIG. 2B and the other Figures herein. This leads to even greater flexibility and resulting minimization of resource usage in such cases.

As shown in FIG. 2A, a given product process 154 (e.g., product process 154₁ of FIG. 2B) is launched in block 202 via interaction with a system user 251, e.g., such as by system user 251 using I/O device/s 170 to select an icon for launching product process 154₁ that is displayed by software product 158₁ as part of a graphical user interface "GUI" on display device 140) or by any other available mechanism (e.g., such as a system popup or toast notifications to the user) that allows host 101 to expose software product 158₁ to system user 251. In other embodiments, a given product process 154 may be launched in host OS 101, for example, by "launch on login" settings, file type handling, background operations, operating system addons, etc. In another embodiment, a given product process 154 may be a service or daemon which executes in the background and may trigger the need for features due to time-based or system-based events.

Figure 2B:
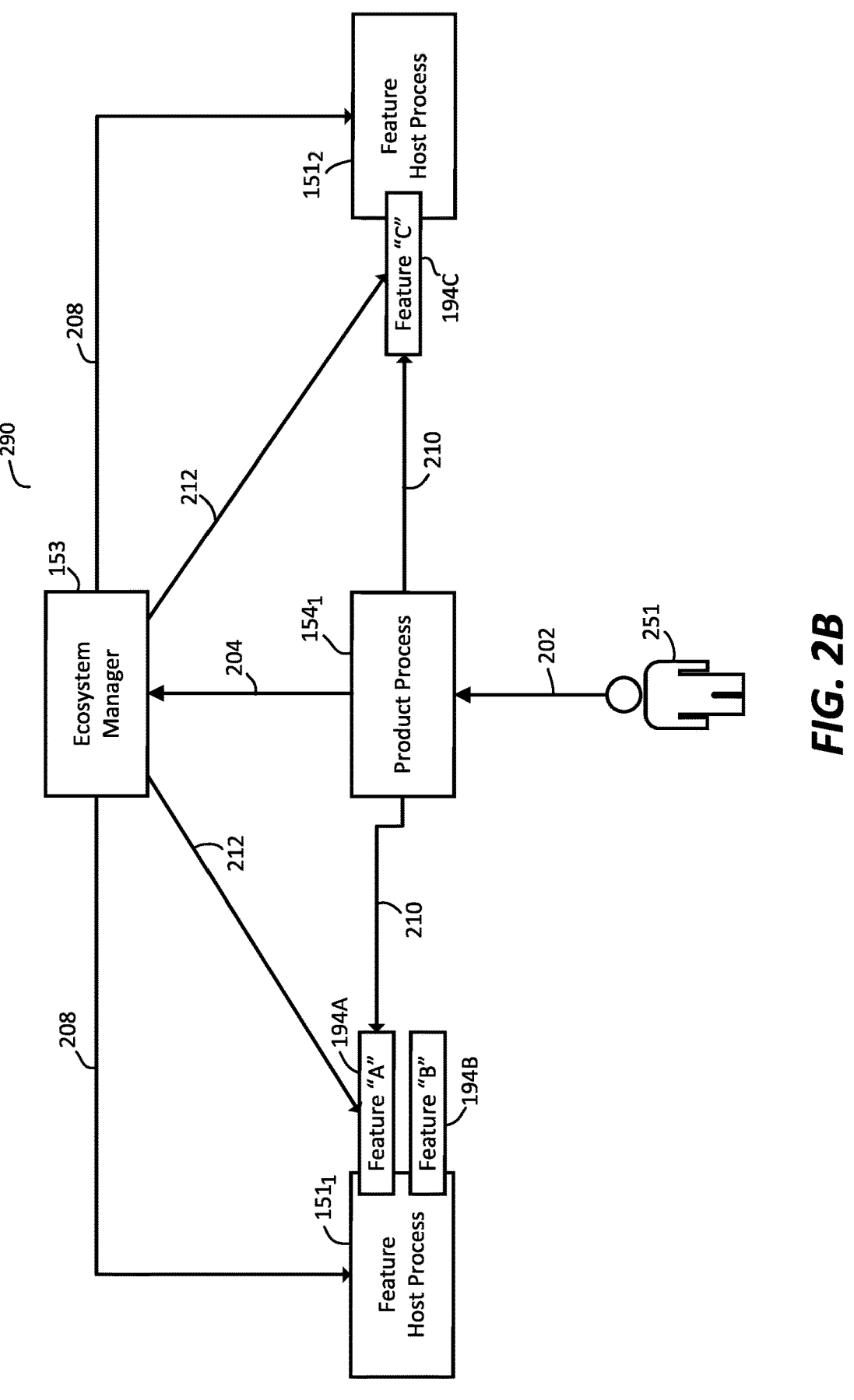
FIG. 2B illustrates a process ecosystem configuration according to one exemplary embodiment of the disclosed systems and methods.

In other embodiments, it is possible that a product process 154 may do most of its work in the background, e.g., with little, if any, interaction with the system user 251. As shown in FIG. 2B, it is also possible that a given product process 154 (e.g., product process 154$_1$ in this case) may also optionally act as a feature host process that hosts one or more features 194X, i.e., that may be used by other product processes 154. In such an optional case, the given product process 154 (e.g., product process 154$_1$ in this case) will remain active as long as it is being used by system user 251 or other process/es executing on host programmable integrated circuit 110, regardless of whether or not feature/s 194X are currently being used by another product process 154. In this embodiment, the given product process 154 may continue to host features (e.g., feature 194) without needing user interaction.

After launching in block 202, the given product process 154 (e.g., product process 154$_1$ of FIG. 2B) interacts (e.g., communicates) in block 204 with ecosystem manager logic 153 by declaring its need to ecosystem manager logic 153 for one or more feature/s 194 (e.g., features 194A and 194C as shown in FIG. 2B). For example, the given product process 154 may declare its need for the one or more feature/s 194 by sending a message (e.g., via interprocess communication or other suitable messaging protocol) to another process that is implementing ecosystem manager logic 153 to notify ecosystem manager logic 153 that it currently needs to use one or more identified particular feature/s 194. As just possible examples, feature 194A may be a software update service, and feature 194C may be a telemetry service. If in block 206 the needed feature/s 194 is already active (i.e., executing and running) and available in the process ecosystem (e.g., made available via one or more corresponding already-active feature host process/es 151), then in block 210 the given product process 154 interacts with (or uses) this already-available feature/s by accessing the already-available feature/s 194 on the corresponding already-active feature host process/es 151.

However, if ecosystem manager logic 153 determines in block 206 that the needed feature/s 194 are not currently active and available on any active feature host process/es 151 in the process ecosystem (e.g., process ecosystem 290 of FIG. 2B), then methodology 200 proceeds to block 208 where ecosystem manager logic 153 launches one or more corresponding previously-inactive feature host process/es 151 that are required or necessary to implement and make active and available the needed feature/s 194 to product process 154$_1$. This is illustrated, for example, in FIG. 2B where ecosystem manager logic 153 launches previously-inactive feature host process 151$_1$ (a single executable process that hosts needed feature 194A along with another unneeded feature 194B such as an OS recovery service), and previously-inactive feature host process 151$_2$ (a single executable process that only hosts feature 194C). Once feature host processes 151$_1$ and 151$_2$ are so launched in block 208, each of needed features 194A and 194C are now active and available. In the embodiment of FIG. 2B, feature 194B is also active and available since it is hosted by now active feature host process 151$_1$, although it is not currently needed or used by any product process 154.

Still referring to FIG. 2A, the given product process 154$_1$ that launched in block 202 may then in block 210 interact with (or use) each of its now available needed feature/s 194 in block 210. For example in the exemplary embodiment of FIG. 2B, product process 154$_1$ may then interact with (or use) each of the now available feature/s features 194A and 194C in block 210 by accessing the now active and available feature 194A on the corresponding now active feature host process 151$_1$, and by accessing the now active and available feature 194C on the corresponding now active feature host process 151$_2$ as shown in FIG. 2B.

As shown in block 212 of FIG. 2A, ecosystem manager logic 153 may keep track of the number of different active product processes 154 that are currently using each active feature 194 of the process ecosystem (e.g., by using reference counts for each active feature 194, or other listing of each given active feature 194 with the number of different active product processes 154 currently using each given active feature 194). In one embodiment, ecosystem manager logic 153 may so keep track of the number of different active product processes 154 that are currently using each active feature 194 of the process ecosystem for purposes of resource management, e.g., such as knowing when the ecosystem manager logic 153 may close down a particular feature host process 151 to manage system resources such as CPU, Memory, Disk input/output (I/O), network usage, etc.

As an illustrative example of block 212 for process ecosystem 290 of FIG. 2B, ecosystem manager logic 153 may update the reference counts for each of feature 194A and 194C in the example lookup table 133 of Table 1 that may be maintained (e.g., in system memory 120) and updated in real time in block 212 for process ecosystem 290 by ecosystem manager logic 153. In this embodiment, the lookup table 133 of Table 1 includes a listing of the number of product processes currently using each of respective features 194, together with the corresponding feature host process 151 that hosts (e.g., implements) each of these respective features 194. As shown in Table 1, each of features 194A and 194C is updated to have a reference count of 1 (e.g., since a single active product process 154$_1$. is currently using both active features 194A and 194C, and active feature 194B has a reference count of 0 since active feature 194B is not currently being used by any active product process 154). Methodology 200 then returns to block 202 and repeats.

TABLE 1

| Feature Host Process | Feature | Number of Product Processes Currently Using the Feature (Reference Count) |
|---|---|---|
| 151$_1$ | 194A | 1 |
| 151$_1$ | 194B | 0 |
| 151$_2$ | 194C | 1 |

Figure 3A:
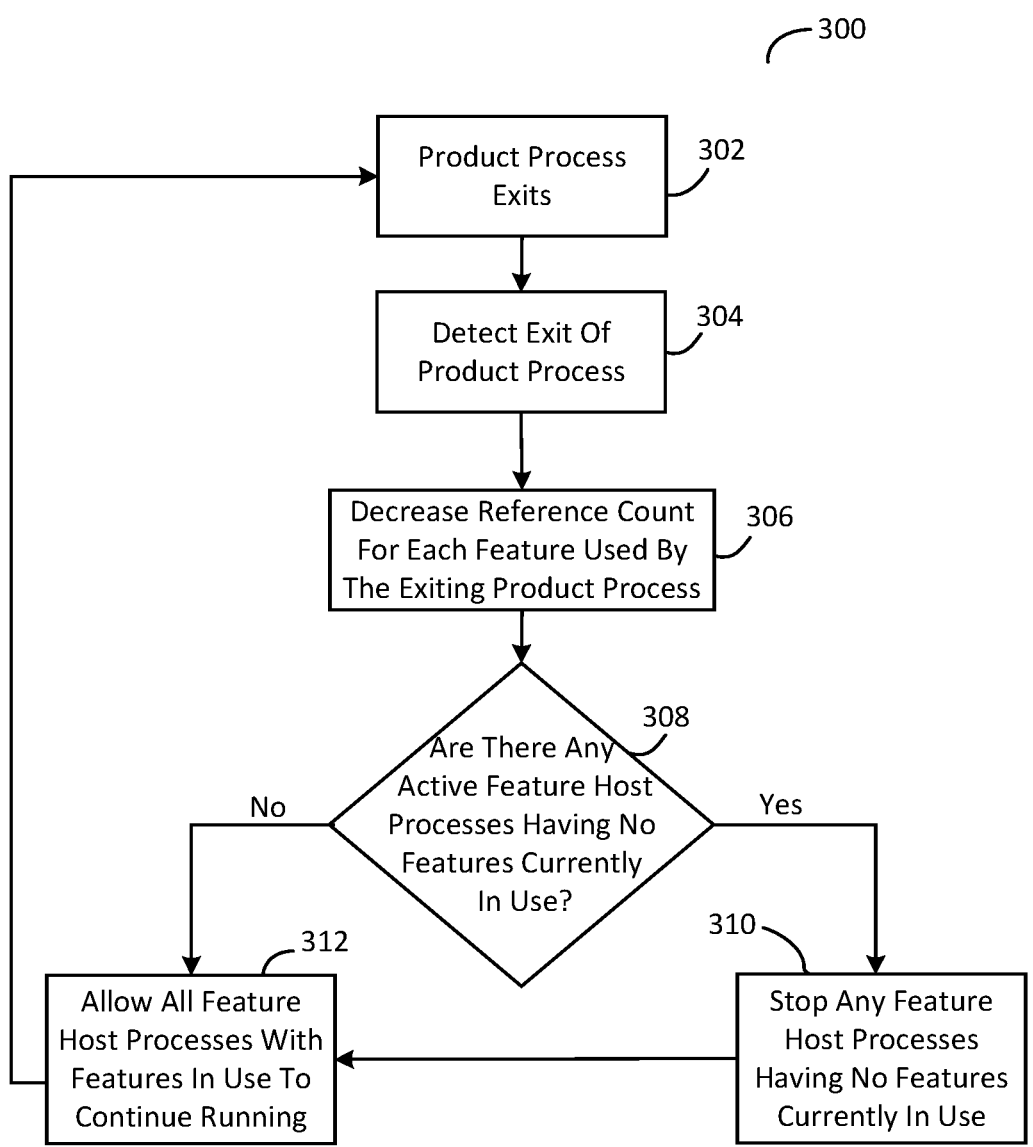
FIG. 3A illustrates methodology according to one exemplary embodiment of the disclosed systems and methods.

FIG. 3A illustrates one exemplary embodiment of a methodology 300 that may be implemented to dynamically adjust the active status of feature/s 194 and their respective feature host process/es 151 upon exit of a product process 154 during runtime of host programmable integrated circuit 110 of information handling system 100. For purposes of illustration, methodology 300 of FIG. 3A is described in relation to an exemplary process ecosystem configuration 390 illustrated in FIG. 3B, it being understood that methodology 300 may be implemented with other configurations of process ecosystems, e.g., having greater or lesser numbers of feature host processes 151 and/or their respective features 194.

Figure 3B:
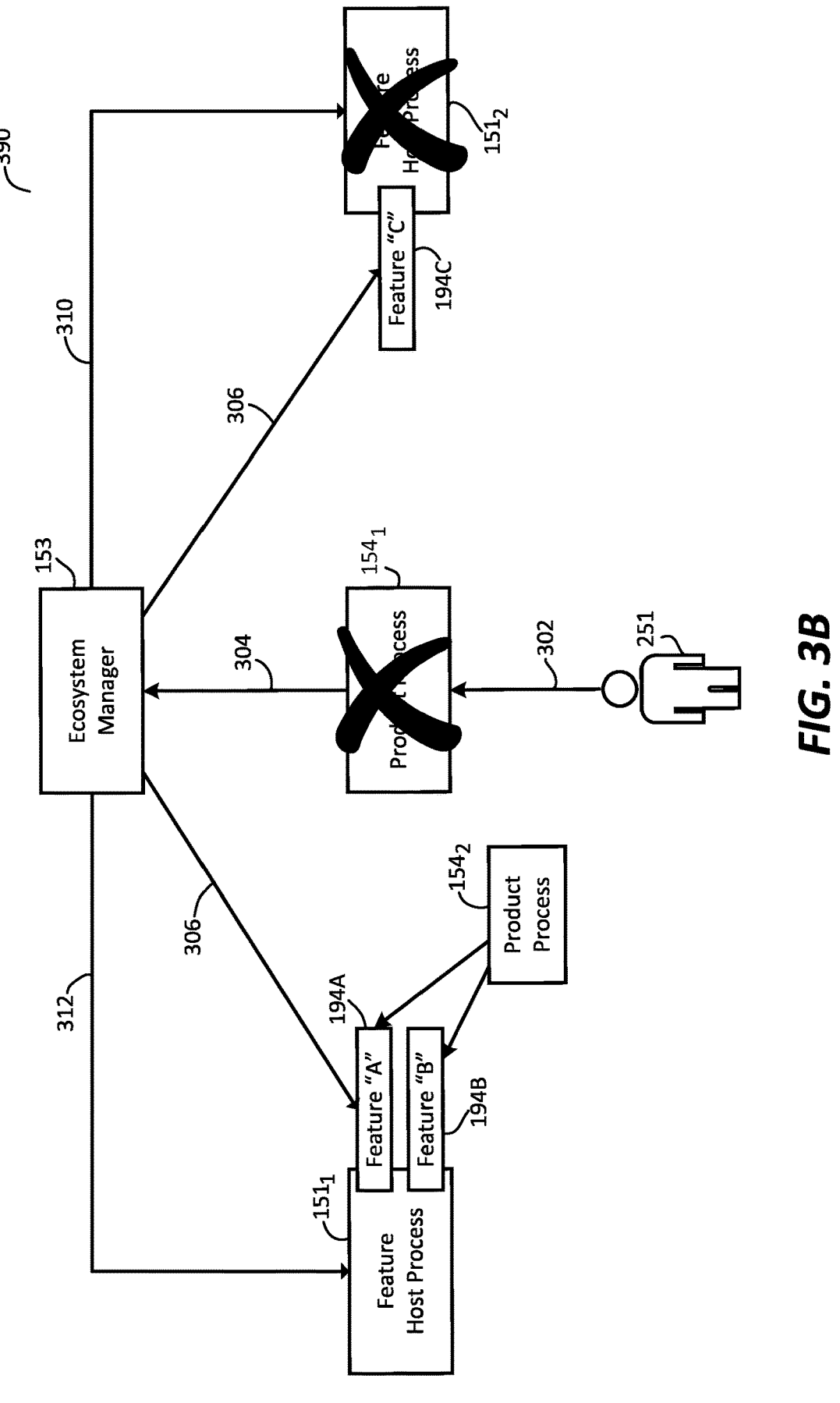
FIG. 3B illustrates a process ecosystem configuration according to one exemplary embodiment of the disclosed systems and methods.

As shown in FIG. 3A, a previously-active product process 154 (e.g., product process 154$_1$ of FIG. 3B) exits (i.e., stops running) in block 302, e.g., because system user 251 quits or stops interacting with product process 154₁ (e.g., such as by using I/O device/s 170 to close product process 154₁ on a GUI of display device 140) or because of some operating system-specific reason (e.g., such as the system user 251 logs out (e.g., user session shutdown), so as to carry out OS or software upgrades, when the information handling system 100 goes to sleep/hibernation, etc.). In FIG. 3B, the exit of product process 154₁ is illustrated by a "X" superimposed over product process 154₁. Before exiting, product process 154₁ was previously using feature 194A hosted by feature host process 151₁ and feature 194C hosted by feature host process 151₂. As also shown in FIG. 3B, another active product process 1542 of process ecosystem 390 remains active and is currently using features 194A and 194B that are hosted by feature host process 151₁. Therefore, before product process 154₁ exits in block 302, ecosystem manager logic 153 maintains (e.g., on system memory 120) the reference counts for each of features 194A, 194B and 194C as shown in the example lookup table 133 of Table 2.

TABLE 2

| Feature Host Process | Feature | Number of Product Processes Currently Using the Feature (Reference Count) |
| --- | --- | --- |
| 151₁ | 194A | 2 |
| 151₁ | 194B | 1 |
| 151₂ | 194C | 1 |

Next, in block 304 ecosystem manager logic 153 detects the exit of the given product process 154 (e.g., product process 154₁ of FIG. 3B) via communication (e.g., via interprocess communication or other suitable messaging protocol) with the given product process 154, and then in block 306 decreases the reference count for each of the features 194 that had previously been used by the exiting given product process 154, e.g., such as features 194A and 194C of FIG. 3B that had previously been used by this exiting product process 154₁. For the exemplary embodiment of FIG. 3B, this is illustrated by the example lookup table 133 of Table 3 that has been updated in real time in block 306 from the previous Table 2 by ecosystem manager logic 153 after exit of product process 154₁. As shown in Table 3 (that results from block 306), feature 194A is updated to have a reference count of 1 (e.g., since a single active product process 1542 remains currently using feature 194A), feature 194C is updated to have a reference count of 0 (e.g., since no active product process 154 remains currently using feature 194C), and feature 194B continues to have a reference count of 1 (e.g., since a single active product process 1542 remains currently using feature 194B).

TABLE 3

| Feature Host Process | Feature | Number of Product Processes Currently Using the Feature (Reference Count) |
| --- | --- | --- |
| 151₁ | 194A | 1 |
| 151₁ | 194B | 1 |
| 151₂ | 194C | 0 |

Next, in block 308, ecosystem manager logic 153 determines from the updated lookup table 133 (or other type of list) if there are any currently active feature host process/es 151 have no features 194 that are currently in use by any product process 154 of the process ecosystem. In one embodiment, ecosystem manager logic 153 may make this determination in block 308 by identifying any feature host process 151 listed in the updated lookup table 133 (or other listing) that only hosts feature/s 194 that are not currently in use and therefore have a reference count of 0. If it is determined in block 308 that all currently active feature host process/es 151 have features 194 that are currently in use (e.g., have a reference count of greater than or equal to 1) by at least one of product process 154 of the process ecosystem, then in block 312 ecosystem manager logic 153 allows all currently active feature host processes to continue running and methodology 300 returns to block 302 and repeats.

However, if any currently active feature host process/es 151 are identified in block 308 to have no features 194 that are currently in use by any product process 154, then in block 310 ecosystem manager logic 153 stops (i.e., stops execution and running of) these identified currently active feature host process/es 151 before proceeding to block 312. For example, in the illustrative embodiment of FIG. 3B and Table 3, ecosystem manager logic 153 identifies feature host process 151₂ as only hosting a single feature 194C which currently has a reference count of 0, and therefore stops feature host process 151₂ in block 310 (e.g., by sending a termination command to feature host process 151₂). In FIG. 3B, the termination of feature host process 151₂ is illustrated by a "X" superimposed over feature host process 151₂. Methodology 300 then proceeds to block 312, where ecosystem manager logic 153 allows the remaining feature host process 151₁ that hosts features 194A and 194B currently in use (i.e., having reference counts of 1 in Table 3) to continue to run.

Figure 4A:
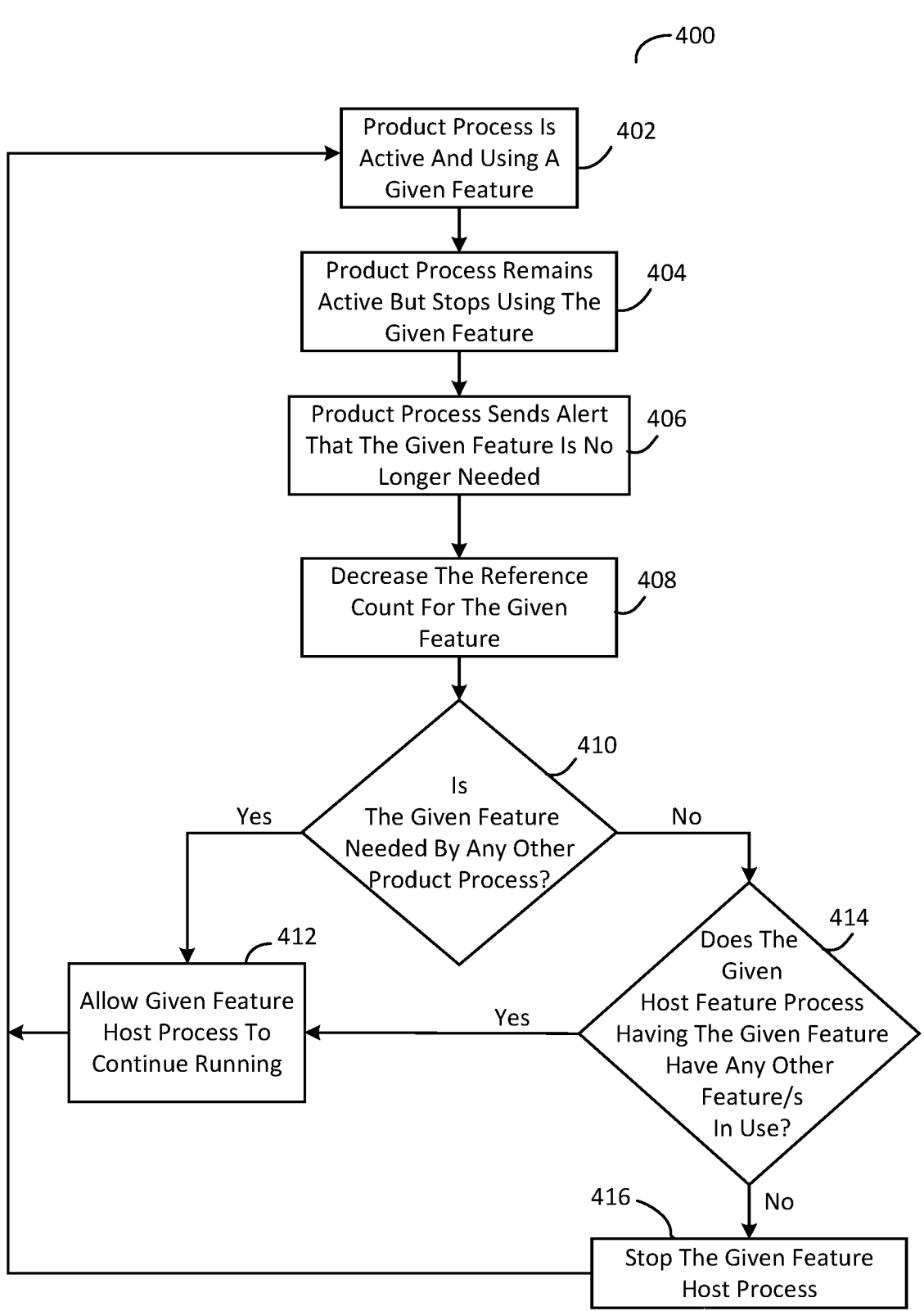
FIG. 4A illustrates methodology according to one exemplary embodiment of the disclosed systems and methods.

FIG. 4A illustrates one exemplary embodiment of a methodology 400 that may be implemented to dynamically adjust the active status of feature/s 194 and their respective feature host process/es 151 when a given active product process 154 remains active but stops using feature/s 194 during runtime of host programmable integrated circuit 110 of information handling system 100. For purposes of illustration, methodology 400 of FIG. 4A is described in relation to an exemplary process ecosystem configuration 490 illustrated in FIG. 4B, it being understood that methodology 400 may be implemented with other configurations of process ecosystems, e.g., having greater or lesser numbers of feature host processes 151 and/or their respective features 194.

Figure 4B:
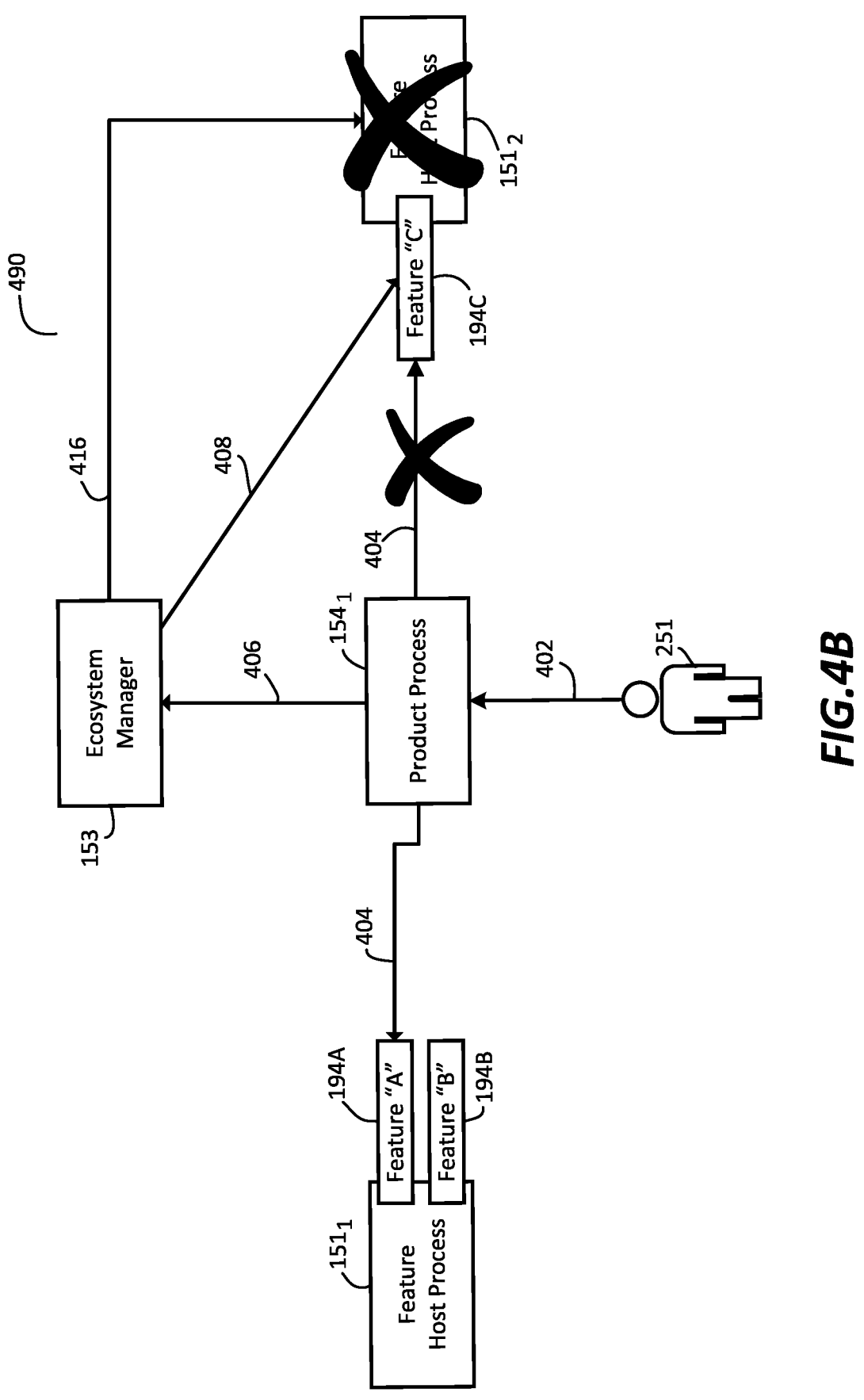
FIG. 4B illustrates a process ecosystem configuration according to one exemplary embodiment of the disclosed systems and methods.

As shown in FIG. 4A, a given product process 154 (e.g., product process 154₁ of FIG. 3B) is active in block 402 because a system user 251 is still currently interacting with the given product process 154 (e.g., user 251 of FIG. 4B may be using I/O device/s 170 to interact with product process 154₁ on a GUI of display device 140). For example, at the time of block 402, active product process 154₁ of FIG. 4B is using both feature 194A hosted by feature host process 151₁ and feature 194C hosted by feature host process 151₂. Table 4 illustrates the status (e.g., contents) of an example lookup table 133 that is maintained by ecosystem manager logic 153 for process ecosystem configuration 490 of FIG. 4B at the time of block 402. As shown in Table 4, feature 194A has a reference count of 1 (e.g., since a single active product process 154₁ is currently using feature 194A), feature 194C has a reference count of 1 (e.g., since active product process 154₁ is currently using feature 194C), and feature 194B has a reference count of 0 (e.g., since no active product process 154 is currently using feature 194B).

13

TABLE 4

| Feature Host Process | Feature | Number of Product Processes Currently Using the Feature (Reference Count) |
|---|---|---|
| $151_1$ | 194A | 1 |
| $151_1$ | 194B | 0 |
| $151_2$ | 194C | 1 |

Next, in block 404, the given product process 154 of block 402 (e.g., product process 154₁ FIG. 4B) remains active, but identifies or otherwise decides that it no longer needs to use one or more given feature/s 194 that it has been previously using and stops using this identified feature/s 194. For example, in the embodiment of FIG. 4B, product process 154₁ decides that it no longer needs to use feature 194C hosted by feature host process 151₂, and therefore stops using feature 194C (as illustrated by a "X" superimposed over the communication arrow between product process 154₁ and feature 194C in FIG. 4B). At this time in block 404, product process 154₁ of FIG. 4B continues using feature 194A hosted by feature host process 151₁ as shown in FIG. 4B.

In block 406, the given product process 154 of blocks 402 and 404 (e.g., product process 154₁ of FIG. 4B) interacts (e.g., communicates via interprocess communication or other suitable communication protocol) with ecosystem manager logic 153 to alert ecosystem manager logic 153 that the given determined feature/s 194 of block 404 is no longer needed, e.g., in the exemplary embodiment of FIG. 4B product process 154₁ alerts ecosystem manager logic 153 that feature 194C has been determined to no longer be needed by product process 154₁. In block 408, ecosystem manager logic 153 responds to the alert of block 406 that is received from the given active product process 154 (e.g., product process 154₁ of FIG. 4B), by decreasing the reference count for the given determined feature/s 194 of block 404 (e.g., feature 194C of FIG. 4B) that had previously been used by active product process 154₁ (e.g., product process 154₁ of FIG. 4B). For the exemplary embodiment of FIG. 4B, this is illustrated in the example lookup table 133 of Table 5 that has been updated in real time from Table 4 in block 408. As shown in Table 5, feature 194A continues to have a reference count of 1 (e.g., since a single active product process 154₁ continues to currently use feature 194A in block 408), and feature 194B continues to have a reference count of 0 (e.g., since no active product process 154 is currently using feature 194B in block 408). However, in Table 5 feature 194C has been updated to have a reference count of 0 (e.g., since no active product process 154 is now currently using feature 194C).

TABLE 5

| Feature Host Process | Feature | Number of Product Processes Currently Using the Feature (Reference Count) |
|---|---|---|
| $151_1$ | 194A | 1 |
| $151_1$ | 194B | 0 |
| $151_2$ | 194C | 0 |

Next, in block 410, ecosystem manager logic 153 determines if the given feature 194 that is no longer needed and used by a given product process 154 in block 404 is currently needed by any other active product process/es 154 of process ecosystem configuration 490. If so, a corresponding given feature host process 151 that hosts the given feature 194 is allowed to continue running in block 412 and methodology 400 returns to block 402 and repeats. However, if ecosystem manager logic 153 determines in block 410 that the given feature 194 of block 404 is currently not needed by any other active product process/es 154 of process ecosystem configuration 490, then methodology 400 proceeds to block 414 as shown. For example, in the exemplary embodiment of FIG. 4B, ecosystem manager logic 153 determines in block 410 from updated Table 5 that feature 194C is currently not needed by any other active product process/es 154 (since it has an updated reference count of 0), and thus methodology 400 proceeds to block 414.

In block 414, ecosystem manager logic 153 determines if the given feature host process 151 (i.e., that was previously hosting the given feature 194 which the product process 154 stopped using in block 404) is hosting any other feature 194 that is currently in use by another product process/es 154. If so, methodology 400 proceeds to block 412 and the given feature host process 151 is allowed to continue running in block 412 and methodology 400 returns to block 402 and repeats. However, if ecosystem manager logic 153 determines in block 414 that the given feature host process 151 is not hosting any other feature 194 that is currently in use by any product process/es 154, then methodology 400 proceeds to block 416 and stops the given feature host process 151 (e.g., by command or a request sent to host OS 101, and returns to block 402 and repeats.

For example, in the embodiment of FIG. 4B, ecosystem manager logic 153 determines from the updated lookup table 133 of Table 5 that feature host process 151₂ is not hosting any other feature 194 that is currently in use by any product process/es 154 (i.e., since feature host process 151₂ does not currently host in feature 194 that has a reference count of 1 or more). Methodology 400 therefore proceeds to block 416 and stops feature host process 151₂ (as shown by the X superimposed over feature host process 151₂ in FIG. 4B), and then returns to block 402 where methodology 400 repeats.

In one optional exemplary debouncing embodiment, a debouncing feature may be optionally implemented to prevent high frequency changes in stopping and starting the same feature host process 151, e.g., such as in a case where a given feature 194 is suddenly no longer needed by a first product process 154 but is then immediately needed by as second product process 154. To illustrate, assume that a first product process 154 uses a given feature 194 that is hosted by a given feature host process 151 that does not host any other currently used feature 194. Also assume that the first product process 154 then either exits (as described in relation to FIG. 3) or stops using the given feature host process 151 (as described in FIG. 4), while at nearly the same time (e.g., within a time period of less than 10 seconds) a second and different product process 154 launches and declares its need for the same given feature 194 (as described in FIG. 2) hosted by the same given feature host process 151. In such a case, a predefined debouncing threshold time (e.g., greater than or equal to 10 seconds) may be implemented to prevent the given feature host process 151 from being stopped (due to exit of the first product process 154 or due to the first product process 154 stopping its use of the given feature 194) and then immediately started again (due to the second product process 154 needing to use the given feature 194). It will be understood that a predefined debouncing threshold time may be greater or less than 10 seconds as needed or desired in other embodiments.

To illustrate implementation of this optional debouncing embodiment in relation to methodology 300 of FIG. 3, block 310 of FIG. 3 is only performed only after a period of time that is greater than or equal to the predefined debouncing threshold time has elapsed from time of detection by ecosystem manager logic 153 of the exit of the first product process 154 in block 304 without a second and different product process 154 in the meantime declaring its need for the given feature 194 that was previously used by the first product process 154 (otherwise block 310 is skipped over without being performed to block 312 in methodology 300 of FIG. 3 if this predefined debouncing threshold time is not met). To illustrate implementation of this optional debouncing embodiment in relation to methodology 400 of FIG. 4, block 416 of FIG. 4 is only performed after a period of time that is greater than or equal to the predefined debouncing time threshold has elapsed from time of receipt by ecosystem manager logic 153 of an alert that the first product process 154 has stopped using the given feature in block 406 without a second and different product process 154 in the meantime declaring its need for the given feature 194 that was previously used by the first product process 154 (otherwise block 416 is skipped over without being performed to block 402 in methodology 400 of FIG. 4 if this predefined debouncing threshold time is not met).

Figure 5A:
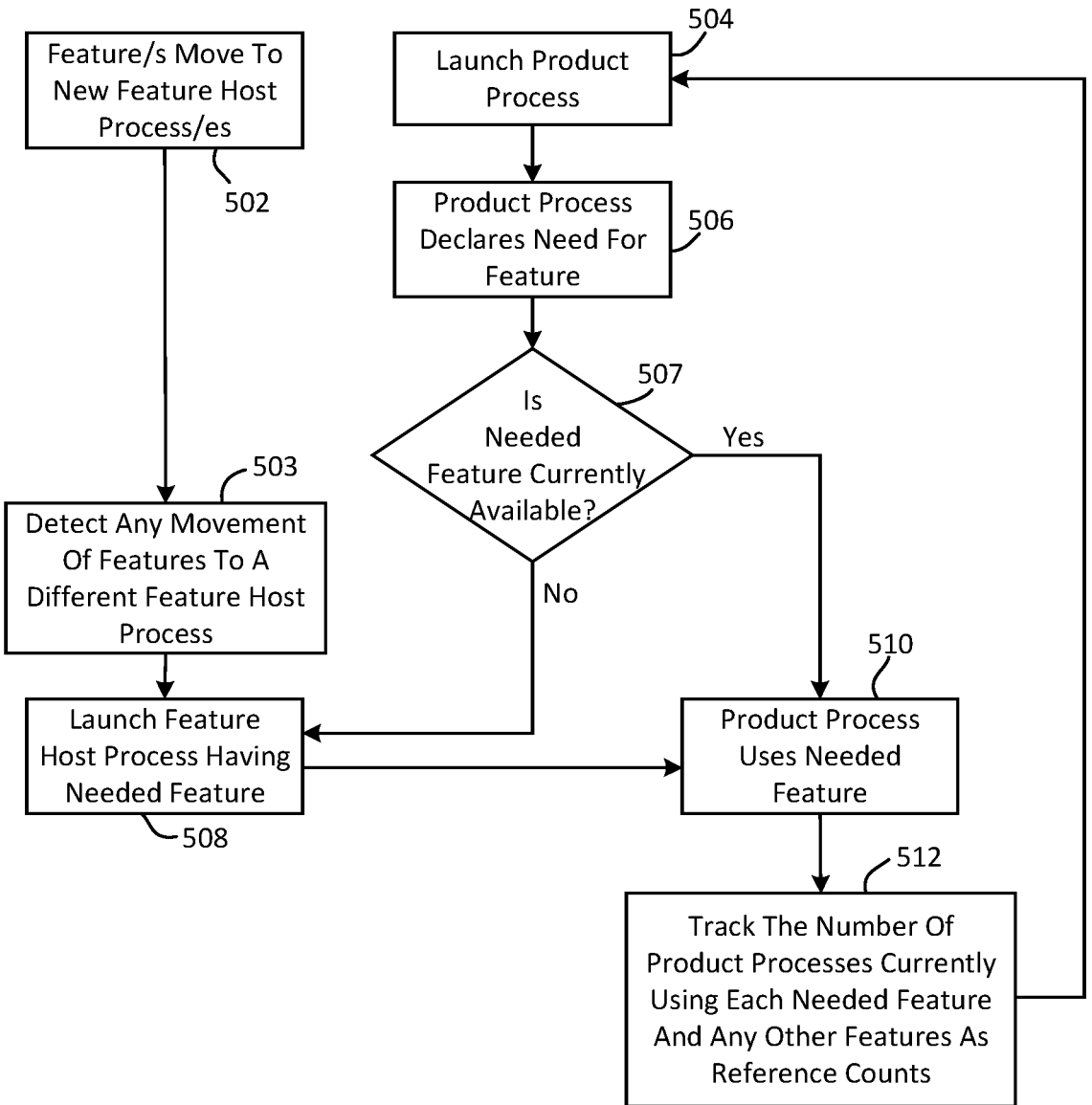
FIG. 5A illustrates methodology according to one exemplary embodiment of the disclosed systems and methods.

FIG. 5A illustrates one exemplary embodiment of a methodology 500 that may be implemented to dynamically detect and dynamically adjust to changes to the configuration of a given process ecosystem, including changes to how one or more feature/s 194 are hosted at runtime by feature host processes 154 of the given process ecosystem. For purposes of illustration, methodology 500 of FIG. 5A is described in relation to an exemplary process ecosystem configuration 590 illustrated in FIG. 5B, it being understood that methodology 500 may be implemented with other configurations of process ecosystems, e.g., having greater or lesser numbers of feature host processes 151 and/or their respective features 194.

In block 502 of methodology 500, each of one or more feature/s 194 hosted by feature host process/es 151 of the process ecosystem are moved from being hosted by one feature host process 151 to being hosted by another and different feature host process 151. For example, in the exemplary embodiment of FIG. 5B, feature "B" has been moved from previously being hosted by feature host process 151₁ (as shown previously hosted in the exemplary embodiment of FIG. 2B) so as to now be hosted by a different feature host process 151₃ (as shown in the exemplary embodiment of FIG. 5B). Such a change in the feature host process 151 that hosts a given feature 194 may occur, for example, due to a change made to one or more of OS processes 151 (e.g., as a result of a software upgrade or update that is received across network 163 from an external server 191 or other external source) or by another more dynamic mechanism for the loading of features 194 (e.g., such as a configuration change such as a change to a Windows operating system registry).

In one embodiment of block 502, ecosystem manager logic 153 may use runtime analysis to determine which particular feature host process 151 will host one or more particular features 194, and to then instruct or otherwise command this particular feature host process 151 to host these determined one or more particular features 194 (e.g., by sending a command via interprocess communication or other suitable messaging protocol to the particular feature host process 151). For example, ecosystem manager logic 153 may determine at runtime that a particular feature host process 151 is to host one or more particular features 194, or may determine at runtime to group multiple selected features 194 (e.g., by lifetime or load properties) to be hosted together by a common particular feature host process 151.

In one exemplary embodiment of block 502, ecosystem manager logic 153 may over time store a historical record of past reference counts for each of features 194 and their respective hosting feature host process/es 151 as a function of elapsed time (e.g., in lookup table 133 or other data listing stored in system memory 120 and/or cache 137 in system storage 130). Ecosystem manager logic 153 may then access this stored historical record and perform runtime analysis of the historical record of past reference counts for each of features 194 and their respective hosting feature host process/es 151 to determine lifetime historical load patterns of features 194. For example, ecosystem manager logic 153 may run an analysis to identify a given group of multiple features 194 that have historically been launched to run concurrently together at the same time on information handling system 100, and then ecosystem manager logic 153 may instruct or otherwise command a selected given feature host process 151 to host two or more (or all) of the individual features 194 of this identified group of multiple features 194 in order to reduce the number of feature host processes 151 that must be active and running (executing) to simultaneously host all of the individual features 194 of this identified group of multiple features 194 that have historically been launched to run concurrently together at the same time.

In another exemplary embodiment of block 502, ecosystem manager logic 153 may determine to group features 194 by feature type for hosting in common by a particular respective feature host process/es 151, e.g., so as to host all network-based features in a common feature host process 151 that may then be shut down when information handling system 100 does not currently have access to a network connection (e.g., such as external network 163).

In one exemplary embodiment, such a change to the hosting of features 194 (e.g., due to a software upgrade or update) may occur during OS runtime (i.e., without a reboot of system 100). However, in other embodiments, such a change to the hosting of features 194 may occur upon start of a new OS runtime, in which case the change will take effect upon next reboot of system 100.

In block 503 of methodology 500, ecosystem manager logic 153 detects (at runtime) the movement of feature/s 194 (i.e., from being originally hosted by one feature host process 151 to being hosted by another new and different feature host process 151) that occurred in block 502. In one embodiment, ecosystem manager logic 153 may be aware of such movement of features 194 by, for example, by receipt of a message (e.g., command) from the original feature host process 151 that it is no longer hosting feature 194 and receipt of a message (e.g., command) from the new and different feature host process 151 that it is now hosting feature 194. In one embodiment, every feature host process 151 that has run at least once may report to ecosystem manager logic 153 what features 194 it owns (i.e., hosts), and therefore ecosystem manager logic 153 will notice the change of the hosting feature host process 151 for a given feature 194. In another embodiment, installers or feature host processes 151 may indicate to ecosystem manager logic 153 (e.g., via registry keys) which features 194 a given feature host process 151 will host, and ecosystem manager logic 153 may react to changes in that information. In another embodiment (e.g., that is described in relation to block 502 above), ecosystem manager logic 153 may have itself previously instructed or otherwise commanded one or more feature host processes 151 to change the identity of the particular feature/s 194 that each of these feature host processes host, in which case ecosystem manager logic 153 will be aware of this change in hosting of the particular feature/s 194 (e.g., by parsing lookup table 133 that is updated and stored by ecosystem manager logic 153).

In the performance of block 503 for the exemplary process ecosystem embodiment of FIG. 5B, ecosystem manager logic 153 detects during runtime that feature "B" has moved from being hosted by a first feature host process 151$_1$ to now only being hosted by a second and different feature host process 151$_3$ as illustrated in FIG. 5B. Also in block 503, ecosystem manager logic 153 may update its listing of which features 194 are now hosted by which respective feature host processes 151 after detecting the movement of feature/s 194, e.g., as shown in the lookup table 133 of Table 6 for the embodiment of FIG. 5B

Still referring to FIG. 5A, a given product process 154 (e.g., product process 154$_1$ of FIG. 5B) is launched in block 504 after or simultaneously with occurrence of the movement of feature/s 194 that occurs in block 502. In block 504 the given product process 154 may be launched in a manner such as previously described herein for block 202 of FIG. 2.

After launching in block 502, the given product process 154 (e.g., product process 154$_1$ of FIG. 2B) interacts (e.g., communicates) in block 506 with ecosystem manager logic 153 by declaring its need to ecosystem manager logic 153 for one or more feature/s 194 (e.g., features 194A and 194C as shown in FIG. 5B). If in block 507 the needed feature/s 194 is already active and available in the process ecosystem (e.g., made available via one or more corresponding already-active feature host process/es 151), then in block 510 the given product process 154 interacts with (or uses) this already-available feature/s by accessing the already-available feature/s 194 on the corresponding already-active feature host process/es 151.

However, if ecosystem manager logic 153 determines in block 507 that the needed feature/s 194 are not currently active and available on any active feature host process/es 151 in the process ecosystem (e.g., process ecosystem 590 of FIG. 5B), then methodology 500 proceeds to block 508 where ecosystem manager logic 153 launches one or more corresponding previously-inactive feature host process/es 151 that are required to implement and make active and available the needed feature/s 194 to product process 154$_1$. In block 503, ecosystem manager logic 153 has detected the movement of feature/s 194 that occurred in block 502, and therefore takes this movement of features 194 into account when determining which feature host process/es 151 to launch in block 508. For example, in the exemplary embodiment of FIG. 5B, feature 194B has moved from being hosted along with feature 194A by a single executable first feature host process 151$_1$ to now only being hosted by a second and different executable feature host process 151$_3$ as illustrated in FIG. 5B. Therefore, in this embodiment ecosystem manager logic 153 launches previously-inactive feature host process 151$_1$ (i.e., that hosts feature 194A only), and previously-inactive feature host process 151$_2$ (i.e., that hosts feature 194C only), but knows (i.e., from block 503) not to launch feature host process 151$_3$ which only hosts unneeded feature 194B (as illustrated by the "X" that is superimposed over feature host process 151$_3$ in FIG. 5B).

Once feature host processes 151$_1$ and 151$_2$ are so launched in block 508, each of needed features 194A and 194C are now active and available. In the embodiment of FIG. 5B, feature 194B is not active and not available since it is now hosted inactive feature host process 151$_3$, Still referring to FIG. 5A, the given product process that launched in block 504 may then in block 510 interact with (or use) each of its now available needed feature/s 194 in block 210. For example in the exemplary embodiment of FIG. 5B, product process 154$_1$ may then interact with (or use) each of the now available feature/s features 194A and 194C in block 510 by accessing the now active and available feature 194A on the corresponding now active feature host process 151$_1$, and by accessing the now active and available feature 194C on the corresponding now active feature host process 151$_2$ as shown in FIG. 5B.

As shown in block 512 of FIG. 5A, ecosystem manager logic 153 may keep track of the number of different active product processes 154 that are currently using each active feature 194 of the process ecosystem as previously described, e.g., for block 212 of FIG. 2. For example, in the exemplary embodiment of FIG. 5B, ecosystem manager logic 153 may update the reference counts for each of feature 194A and 194C in the example lookup table 133 of Table 6 in block 512. As shown in Table 6, each of features 194A and 194C is updated to have a reference count of 1 (e.g., since a single active product process 154$_1$. is currently using both active features 194A and 194C hosted by respective feature host processes 151$_1$ and 151$_2$, and unneeded feature 194B hosted by inactive feature host process 151$_3$ has a reference count of 0 since unneeded feature 194B is not currently being used by any active product process 154). Methodology 500 then returns to block 502 and repeats.

TABLE 6

| Feature Host Process | Feature | Number of Product Processes Currently Using the Feature (Reference Count) |
|---|---|---|
| 151$_1$ | 194A | 1 |
| 151$_2$ | 194C | 1 |
| 151$_3$ | 194B | 0 |

It will be understood that the example methodologies of FIGS. 2A, 2B, 3A, 3B, 4A, 4B, 5A and 5B herein are exemplary only, and that any other combination of additional, fewer and/or alternative blocks may be employed that is suitable for accomplishing the task/s and/or achieving the purpose/s of the corresponding methodology of each of FIGS. 2A, 2B, 3A, 3B, 4A, 4B, 5A and 5B.

It will also be understood that one or more of the tasks, functions, or methodologies described herein (e.g., including those described herein for components 101, 102, 110, 120, 125, 130, 140, 151, 153, 154, 158, 160, 163, 166, 170, 171, 173, 174, 175, 179, 180, 181, 183, 190, 191, 194, etc.) may each be implemented by circuitry and/or by a computer program of instructions (e.g., computer readable code such as firmware code or software code) embodied in a non-transitory tangible computer readable medium (e.g., optical disk, magnetic disk, non-volatile memory device, etc.), in which the computer program includes instructions that are configured when executed on a processing device in the form of a programmable integrated circuit (e.g., processor such as CPU, controller, microcontroller, microprocessor, ASIC, etc. or programmable logic device "PLD" such as FPGA, complex programmable logic device "CPLD", etc.) to perform one or more blocks of the methodologies disclosed herein. In one embodiment, a group of such processing devices may be selected from the group consisting of CPU, controller, microcontroller, microprocessor, FPGA, CPLD and ASIC. The computer program of instructions may include an ordered listing of executable instructions for implementing logical functions in an processing system or component thereof. The executable instructions may include a plurality of code segments operable to instruct components of an processing system to perform the methodologies disclosed herein.

It will also be understood that one or more blocks of the present methodologies may be employed in one or more code segments of the computer program. For example, a code segment executed by the information handling system may include one or more blocks of the disclosed methodologies. It will be understood that a processing device may be configured to execute or otherwise be programmed with software, firmware, logic, and/or other program instructions stored in one or more non-transitory tangible computer-readable mediums (e.g., data storage devices, flash memories, random update memories, read only memories, programmable memory devices, reprogrammable storage devices, hard drives, floppy disks, DVDs, CD-ROMs, and/or any other tangible data storage mediums) to perform the operations, tasks, functions, or actions described herein for the disclosed embodiments.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touch screen and/or a video display. The information handling system may also include one or more buses operable to transmit communications between the various hardware components.

While the invention may be adaptable to various modifications and alternative forms, specific embodiments have been shown by way of example and described herein. However, it should be understood that the invention is not intended to be limited to the particular forms disclosed. Rather, the invention is to cover all modifications, equivalents, and alternatives falling within the spirit and scope of the invention as defined by the appended claims. Moreover, the different aspects of the disclosed systems and methods may be utilized in various combinations and/or independently. Thus the invention is not limited to only those combinations shown herein, but rather may include other combinations.

What is claimed is:

1. A method, comprising using at least one programmable integrated circuit of an information handling system to:

manage execution of multiple host processes, each of the host processes hosting one or more respective features on the information handling system; and execute one or more other processes on the information handling system;

where the method further comprises using the at least one programmable integrated circuit of the information handling system to manage the execution of the multiple host processes by:

dynamically at runtime discovering the identity of the respective features hosted by each of the host processes, executing only those of the host processes that host at least one feature that is currently needed or currently used by at least one of the other processes to share the at least one feature with the at least one of the other processes that currently needs or uses the at least one feature, and terminating execution of any of the host processes that is currently executing on the programmable integrated circuit and that hosts no features which are currently needed or used by any of the other processes; and where the method further comprises using the at least one programmable integrated circuit of the information handling system to:

detect at runtime that at least a given one of the other processes that is executing to use at least one given feature hosted and shared by at least a given one of the host processes no longer needs to use the at least one given feature hosted by the at least a given one of the host processes;

then determine whether or not any other process is currently using the at least one given feature hosted by the at least a given one of the host processes;

then stop execution of the at least a given one of the host processes in response to a determination that no other processes is currently using the at least one given feature hosted by the at least a given one of the host processes; and then continue execution of the at least a given one of the host processes in response to a determination that at least one other processes is currently using the at least one given feature hosted by the at least a given one of the host processes.

2. The method of claim 1, where each of the multiple host processes is an operating system (OS) process; and where each of the other processes is a process provided by a respective software product on the information handling system.

3. The method of claim 2, where the process exposes its respective software product to a user of the information handling system.

4. The method of claim 1, wherein said executing only those of the host processes that host at least one feature that is currently needed or currently used by at least one of the other processes comprises:

executing only those of the host processes that host at least one feature that is currently needed or currently used by at least one of the other processes to use interprocess communication to share the at least one feature with the at least one of the other processes that currently needs or uses the at least one feature.

5. The method of claim 1, further comprising using the at least one programmable integrated circuit of the information handling system to track a number of the other processes that currently need or are currently using one or more features hosted by one or more of the host processes.

6. The method of claim 1, further comprising using the at least one programmable integrated circuit of the information handling system to:

execute the at least one of the other processes to provide a notification that it needs the at least one feature hosted by the at least one of the host processes that is currently not executing; and then, if the at least one of the host processes is not executing, launch the at least one of the host processes to share the at least one feature with the at least one of the other processes.

7. The method of claim 1, further comprising using the at least one programmable integrated circuit of the information handling system to:

detect at runtime the exit of the at least a given one of the other processes that is using at the least one given feature hosted by the at least a given one of the host processes that is currently executing to share the at least a given one of the host processes with the at least a given one of the other processes;

then determine whether or not any other process is currently using the at least one given feature hosted by the at least a given one of the host processes;

then stop execution of the at least a given one of the host processes in response to a determination that no other processes is currently using the at least one given feature hosted by the at least a given one of the host processes; and then continue execution of the at least a given one of the host processes in response to a determination that at least one other processes is currently using the at least one given feature hosted by the at least a given one of the host processes.

8. The method of claim 7, further comprising using the at least one programmable integrated circuit of the information handling system to update a reference count to show whether or not any other processes currently need or are currently using the at least one given feature hosted by the at least a given one of the host processes after the exit of the at least a given one of the other processes, and then use the updated reference count to make the determination whether or not any other process is currently using the at least one given feature hosted by the at least a given one of the host processes.

9. The method of claim 1, further comprising using the at least one programmable integrated circuit of the information handling system to update a reference count to show whether or not any other processes currently need or are currently using the at least one given feature hosted by the at least a given one of the host processes after detecting at runtime that the given one of the other processes no longer needs to use the at least one given feature hosted by the at least a given one of the host processes, and then use the updated reference count to make the determination whether or not any other process is currently using the at least one given feature hosted by the at least a given one of the host processes.

10. The method of claim 1, further comprising using the at least one programmable integrated circuit of the information handling system to:

detect at runtime that the at least a given feature that was previously hosted and shared by the at least a given one of the host processes has moved to currently be hosted and shared by at least another given one of the host processes and not to be hosted by the at least a given one of the host processes;

then execute at least one of the other processes to provide a notification that it needs the at least one given feature now hosted by the at least another given one of the host processes when the at least another given one of the host processes is currently not executing; and then, if the at least another given one of the host processes is not executing, launch the at least another given one of the host processes to share the at least one given feature with the at least one of the other processes.

11. The method of claim 1, wherein said terminating execution of any of the host processes that is currently executing on the programmable integrated circuit and that hosts no features which are currently needed or used by any of the other processes comprises:

perform the termination of the execution of any given one of the host processes that is currently executing on the programmable integrated circuit and that hosts no features which are currently needed or used by any of the other processes only after a predefined threshold time has elapsed since a time that the given one of the host processes last hosted a feature that was needed or used by any of the other processes; and continue to execute the given one of the host processes until the predefined threshold time has elapsed since the time that the given one of the host processes last hosted the feature that was needed or used by any of the other processes.

12. The method of claim 11, further comprising using the at least one programmable integrated circuit of the information handling system to:

determine at runtime the identity of at least one given host process and the identity of one or more given features to be hosted by the at least one given host process; and then instruct the at least one given host process to host the one or more given features.

13. An information handling system, comprising at least one programmable integrated circuit that is programmed to:

manage execution of multiple host processes, each of the host processes hosting one or more respective features on the information handling system; and execute one or more other processes on the information handling system;

where at least one programmable integrated circuit is programmed to manage the execution of the multiple host processes by:

dynamically at runtime discovering the identity of the respective features hosted by each of the host processes, executing only those of the host processes that host at least one feature that is currently needed or currently used by at least one of the other processes to share the at least one feature with the at least one of the other processes that currently needs or uses the at least one feature, and terminating execution of any of the host processes that is currently executing on the programmable integrated circuit and that hosts no features which are currently needed or used by any of the other processes; and where the at least one programmable integrated circuit of the information handling system is further programmed to:

detect at runtime that at least a given one of the other processes that is executing to use at least one given feature hosted and shared by at least a given one of the host processes no longer needs to use the at least one given feature hosted by the at least a given one of the host processes;

then determine whether or not any other process is currently using the at least one given feature hosted by the at least a given one of the host processes;

then stop execution of the at least a given one of the host processes in response to a determination that no other processes is currently using the at least one given feature hosted by the at least a given one of the host processes; and then continue execution of the at least a given one of the host processes in response to a determination that at least one other processes is currently using the at least one given feature hosted by the at least a given one of the host processes.

14. The information handling system of claim 13, where the at least one programmable integrated circuit of the information handling system is programmed to execute only those of the host processes that host at least one feature that is currently needed or used by at least one of the other processes to use interprocess communication to share the at least one feature with the at least one of the other processes that currently needs or uses the at least one feature.

15. The information handling system of claim 13, where the at least one programmable integrated circuit of the information handling system is programmed to track a number of the other processes that currently need or are currently using one or more features hosted by one or more of the host processes.

16. The information handling system of claim 13, where the at least one programmable integrated circuit of the information handling system is programmed to:

execute the at least one of the other processes to provide a notification that it needs the at least one feature hosted by the at least one of the host processes that is currently not executing; and then, if the at least one of the host processes is not executing, launch the at least one of the host processes to share the at least one feature with the at least one of the other processes.

17. The information handling system of claim 13, where the at least one programmable integrated circuit of the information handling system is programmed to:

detect at runtime the exit of the at least a given one of the other processes that is using at the least one given feature hosted by the at least a given one of the host processes that is currently executing to share the at least a given one of the host processes with the at least a given one of the other processes;

then determine whether or not any other process is currently using the at least one given feature hosted by the at least a given one of the host processes;

then stop execution of the at least a given one of the host processes in response to a determination that no other processes is currently using the at least one given feature hosted by the at least a given one of the host processes; and then continue execution of the at least a given one of the host processes in response to a determination that at least one other processes is currently using the at least one given feature hosted by the at least a given one of the host processes.

18. The information handling system of claim 13, where the at least one programmable integrated circuit of the information handling system is programmed to:

detect at runtime that the at least a given feature that was previously hosted and shared by the at least a given one of the host processes has moved to currently be hosted and shared by at least another given one of the host processes and not to be hosted by the at least a given one of the host processes;

then execute at least one of the other processes to provide a notification that it needs the at least one given feature now hosted by the at least another given one of the host processes when the at least another given one of the host processes is currently not executing; and then, if the at least another given one of the host processes is not executing, launch the at least another given one of the host processes to share the at least one given feature with the at least one of the other processes.

19. The information handling system of claim 13, where the at least one programmable integrated circuit of the information handling system is programmed to:

perform the termination of the execution of any given one of the host processes that is currently executing on the programmable integrated circuit and that hosts no features which are currently needed or used by any of the other processes only after a predefined threshold time has elapsed since a time that the given one of the host processes last hosted a feature that was needed or used by any of the other processes; and continue to execute the given one of the host processes until the predefined threshold time has elapsed since the time that the given one of the host processes last hosted the feature that was needed or used by any of the other processes.

20. The information handling system of claim 13, where the at least one programmable integrated circuit of the information handling system is programmed to:

determine at runtime the identity of at least one given host process and the identity of one or more given features to be hosted by the at least one given host process; and then instruct the at least one given host process to host the one or more given features.

* * * * *